Patented Apr. 29, 1941

2,240,318

UNITED STATES PATENT OFFICE 2,240,318

RESOLUTION OF RACEMIC MIXTURES

Donalee L. Tabern, Lake Bluff, Ill., assignor to Abbott Laboratories, North Chicago, Ill., a corporation of Illinois No Drawing. Application July 17, 1939, Serial No. 284,876

11 Claims. (Cl. 260—485)

The present invention relates to the resolution of racemic aryl-alkyl-amines. More specifically the present invention relates to the resolution of aryl-amino-alkanols, e. g. ephedrine and related compounds.

During the past fifteen years ephedrine has come to play an increasingly important role in medicine. It is employed not only as a pressor drug (for maintaining blood pressure) but through its relaxant effects on smooth muscle fiber is widely used to produce relief in asthma, hay-fever, etc. It is the active constituent in many nasal sprays, in drugs for the relief of menstrual pain and in the so-called "cough syrups."

The naturally occurring ephedrine is the laevo (l) rotatary form. This form has been shown to be appreciably more active than the racemic (d-l) mixtures and considerably more active than the enantiomorphic d-form. Synthetic ephedrine prepared from the usual intermediates naturally results in the production of a racemic d-l mixture. The separation of the desired l-form from the relatively physiologically inactive d-form has long been a problem in the preparation of synthetic (l) ephedrine for use in the medical field.

Several methods have been proposed for the resolution of ephedrine heretofore. One of these involves the use of a d-l mixture of tartaric acid. This prior method has been found unsatisfactory as the undesired d-ephedrine-d-tartrate salt tends to separate first making the recovery of the more soluble laevo salt from the mother liquor very difficult. Laevo tartaric acid would yield the desired optical isomer but unfortunately tartaric acid occurs in nature as a d-l mixture. Thus in order to operate satisfactorily with l-tartaric acid it is necessary to separate the l form from the naturally occurring d-l mixture by an initial resolution with an optically active base. The disadvantages of such a process requiring an additional resolution are apparent.

Another prior art method involves the use of optically active mandelic acids. This method is open essentially to the same objections as those encountered in the use of tartaric acid. The use of active mandelates involves an additional disadvantage as the resolving agent itself undergoes racemization with some ease.

Therefore, the principal object of the present invention is to provide an improved method for resolving ephedrine and ephedrine-like compounds.

Other objects will be apparent as the description hereinafter proceeds.

I have discovered that mono-menthol esters of saturated dibasic aliphatic acids provide an effective means for resolving racemic ephedrine mixtures. Natural menthol which is relatively inexpensive occurs as the laevo form and furnishes the desired optically active group. The free carboxyl group of the saturated dibasic aliphatic acid furnishes the strongly acidic group for salt formation with the basic ephedrine.

The esters for use in the present invention may be prepared with good yields by (1) reacting natural menthol with the proper acid at about 130°–180° C., (2) by forming the dimenthol ester through the acid chloride and hydrolizing off one menthol group with alkali, and (3) by heating the acid anhydride with menthol in excess pyridine, etc. The resolving esters may be readily recovered from the liquors and used again and again,—a very important point in commercial production.

The following representative examples will serve to illustrate the present invention:

Example I

About 60 grams of menthol succinic ester and about 66 grams of d-l-ephedrine are dissolved in 800 cc. of n-butyl acetate at about 80° C. The salt formation is immediate and the reaction mixture is allowed to cool spontaneously. Upon seeding with pure l-ephedrine-l-menthol succinate crystallization ensues rapidly. After standing for about three hours the crystals are filtered with suction, washed with about 100 cc. of n-butyl acetate and finally with pentane.

The mother liquors recovered by filtration may be used successively to dissolve a second and then a third batch of materials. The combined lots of crystals have an $[\alpha]_D$ of 58–60°. Decomposition of the l-ephedrine-l-menthol succinate salt (M. Pt. 136°–138° C.) with mineral acid, alkalinization and extraction of the alkaloid base and conversion to the hydrochloride salt are carried out in the usual manner. A single recrystallization of the l-ephedrine hydrochloride from alcohol gives a substantially pure product melting at 185–187° C. and having an $[\alpha]_D$ of 33–34°.

Example II

About 6 grams of malonic mono menthol ester and about 8 grams of d-l-ephedrine base are dissolved in a small amount of ethyl acetate, cooled and seeded as in Example I. As crystallization ensues more of the solvent should be added to maintain a thin slurry. After several hours standing the salt crystals are recovered by filtration and washed. This product has a rotation of about $[\alpha]_D$ 58°,—the same as that of the pure l-ephedrine-l-menthol malonate salt. The pure l-ephedrine may be recovered as outlined in Example I.

Example III

In a similar manner the mono menthol esters of oxalic, glutaric, adipic, etc. acids may be used in accordance with Examples I or II for the resolution of ephedrine. In each case practically pure laevo salts are obtained from which the desired l-ephedrine may be secured in the usual manner. The free resolving agent (menthol ester) may be recovered and re-used as previously indicated.

*Example IV*

About 8 grams of phenyl-amino-propane (benzedrine) base and about 8 grams of mono l-menthol succinic ester are dissolved in a little ethyl acetate and allowed to crystallize in a cold room. The isolated salt crystals are then decomposed with acid in the usual manner and the phenyl amino propane isolated and dissolved in a slight excess of acid. The resulting solution is strongly laevo-rotatory and contains the desired laevo-salt.

The reaction liquor solvents employed may vary widely, even water giving some resolution. However, I have found the use of an inert organic solvent and particularly the esters such as methyl acetate, ethyl acetate, and the isomeric butyl and amyl acetates to be preferred. The complex menthol-ephedrine salts in this type of solvent are very soluble in hot solutions but relatively insoluble in cold solutions from which they separate rapidly in a readily filterable form. A point contributing markedly to economy resides in the fact that several resolutions may be carried out in the same liquors. The salts obtained are practically optically pure without further treatment.

The amount of resolving agent may vary from somewhat less than one-half mol to somewhat more than one mol per mol of ephedrine. Ordinarily the former amount is preferred because less reagent is required and the d-base is left in solution in its original form as a very soluble base.

While I have illustrated the present invention with certain preferred examples, it will be understood that the present invention is not limited thereto. For example, although succinic acid is the preferred acid for use with ephedrine any of the saturated aliphatic dibasic acids may be substituted therefor. Ordinarily it is preferred to use a dibasic acid containing two to six carbon atoms. Similarly, although the present invention is directed in particular to the resolution of ephedrine, it will be understood that process of the present invention is adaptable for the resolution of related racemic aryl-alkyl-amines such as benzedrine and the like. In the specification and claims the term "ephedrine" is intended to include ephedrine and all equivalent ephedrine-like phenyl alkyl or alkanol amines. It will also be understood that the term "menthol" as used in the specification and claims is directed to the natural occurring menthol which is the laevo-form.

All modifications and variations coming within the spirit and scope of the present invention are intended to be covered by the claims annexed hereto. Specifically, the claims of the present invention are intended to cover all processes employing the l-mono-menthol esters of saturated dibasic aliphatic acids in the resolution of ephedrine and related compounds.

I claim:

1. The steps in the process of resolving a racemic mixture, comprising reacting a mono-menthol ester of a lower saturated dicarboxylic aliphatic acid with a racemic d-l-ephedrine mixture in a reaction solvent, and separating the resulting l-ephedrine-salt of the menthol ester of said aliphatic acid from the d-ephedrine compound.

2. The steps in the process of resolving a racemic mixture, comprising reacting a mono-menthol ester of a lower saturated dicarboxylic aliphatic acid with a d-l-ephedrine mixture in a hot inert organic solvent liquor, cooling the reaction mixture and separating the resulting precipitate consisting essentially of the l-ephedrine salt of the menthol ester of said aliphatic acid from the reaction liquor containing the d-ephedrine compound in solution.

3. The steps in the process of resolving a racemic mixture, comprising reacting mono-menthol succinic ester with a d-l-ephedrine mixture in a reaction solvent, and separating the resulting l-ephedrine-menthol succinate from the d-ephedrine compound.

4. The steps in the process of resolving a racemic mixture, comprising reacting a mono-menthol ester of succinic acid with a d-l-ephedrine mixture in a hot inert ester solvent liquor, cooling the reaction mixture and separating the resulting precipitate consisting essentially of the l-ephedrine salt of the menthol ester of succinic acid from the reaction liquor containing the d-ephedrine compound in solution.

5. The steps in the process of resolving a racemic mixture, comprising reacting mono-menthol succinic ester with a d-l-ephedrine mixture in a hot n-butyl acetate reaction liquor, cooling the reaction mixture and separating the resulting l-ephedrine-menthol succinate precipitate from the reaction liquor containing the d-ephedrine compound in solution.

6. The steps in the process of resolving a racemic mixture, comprising reacting mono-menthol malonic ester with a d-l-ephedrine mixture in a hot alkyl-acetate reaction liquor, cooling the reaction mixture and separating the resulting l-ephedrine-menthol malonate precipitate from the reaction liquor containing the d-ephedrine compound in solution.

7. The steps in the process of resolving a racemic mixture, comprising reacting mono-menthol adipic ester with a d-l-ephedrine mixture in a hot aliphatic acid ester reaction liquor, cooling the reaction mixture and separating the resulting l-ephedrine-menthol-adipate precipitate from the reaction liquor containing the d-ephedrine compound in solution.

8. The steps in the process of resolving a racemic mixture, comprising reacting l-mono-menthol ester of succinic acid with a d-l-ephedrine mixture in a hot inert organic ester solvent liquor, cooling the reaction mixture, seeding the reaction liquor with a crystal of pure l-ephedrine-l-menthol-succinate, separating the resulting precipitate consisting of substantially pure l-ephedrine-l-menthol succinate from the reaction liquor containing the d-ephedrine compound in solution, and subsequently treating the l-ephedrine-l-menthol succinate salt so as to recover free l-ephedrine.

9. Products of a process of resolving a racemic mixture, consisting of d- and l-ephedrine salts of mono-menthol esters of lower saturated dicarboxylic aliphatic acids.

10. Laevo-ephedrine salts of mono-menthol esters of saturated dibasic aliphatic acids, said acids being selected from the group consisting of dibasic aliphatic acids containing 2 to 6 carbon atoms.

11. Laevo-ephedrine salt of mono-menthol ester of succinic acid.

DONALEE L. TABERN.